United States Patent [19]

Badesha et al.

[11] Patent Number: 4,557,922

[45] Date of Patent: * Dec. 10, 1985

[54] PROCESS FOR PREPARATION OF CHALCOGENS AND CHALCOGENIDE ALLOYS OF CONTROLLED AVERAGE CRYSTALLITE SIZE

[75] Inventors: Santokh S. Badesha, Ontario; George T. Fekete, Rochester, both of N.Y.

[73] Assignee: Xerox Corporation, Stamford, Conn.

[*] Notice: The portion of the term of this patent subsequent to Jul. 17, 2001 has been disclaimed.

[21] Appl. No.: 603,019

[22] Filed: Apr. 23, 1984

[51] Int. Cl.$^4$ .............................................. C01B 19/02
[52] U.S. Cl. .................................... 423/510; 75/0.5 R
[58] Field of Search ...................... 204/59 R, 59 M; 75/0.5 R; 423/508, 509, 510

[56] References Cited

U.S. PATENT DOCUMENTS

| | | | |
|---|---|---|---|
| 3,933,990 | 1/1976 | Gentile et al. | 423/508 |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,175,959 | 11/1979 | Karam et al. | 423/510 |
| 4,224,301 | 11/1980 | Washall | 423/508 |
| 4,239,844 | 12/1980 | Faria et al. | 430/67 |
| 4,256,912 | 3/1981 | Wolsky et al. | 423/508 |
| 4,389,389 | 6/1983 | Badesha | 423/510 |
| 4,448,646 | 5/1984 | Badesha et al. | 204/59 R |
| 4,460,408 | 7/1984 | Badesha et al. | 423/510 |

Primary Examiner—John F. Niebling
Assistant Examiner—Terryence Chapman
Attorney, Agent, or Firm—E. O. Palazzo

[57] ABSTRACT

Chalcogens and chalcogenide alloys of controlled crystal size are prepared by subjecting the esters to a reduction reaction. The esters may be prepared by treating the corresponding oxides of the desired elements with an alcohol or glycol and then in one embodiment, converted into the desired chalcogen alloys by subjecting a solution mixture of the resulting esters to a co-reduction reaction at high temperatures. The resulting chalcogens and chalcogenide alloys are useful for the preparation of xerographic photoconductive compositions.

15 Claims, No Drawings

PROCESS FOR PREPARATION OF CHALCOGENS AND CHALCOGENIDE ALLOYS OF CONTROLLED AVERAGE CRYSTALLITE SIZE

BACKGROUND

This invention is generally directed to processes for the preparation of chalocogens, and chalcogenide alloys, and more specifically the present invention is directed to the preparation of non-crystalline chalcogenides, and chalcogenide alloys, or of chalcogenides, and chalcogenide alloys of a specific average crystallite size, (ACS). In one embodiment of the present invention there is provided a process for the preparation of small particles of selenium, selenium alloys, trigonal selenium, trigonal tellurium, and trigonal selenium tellurium alloys by the reduction reaction, or coreduction reaction of the corresponding chalcogen, or chalcogenide esters. Accordingly, there is provided in accordance with the present invention a simple, economically attractive, low temperature process for the direct preparation of small particle chalcogens, and chalcogenide alloys of desired average crystallite size, or of a non-crystalline nature by controlling the temperature of the ester reduction reactions involved. The resulting chalcogens, and chalcogenide alloys are useful for the preparation of xerographic photoconductive compositions, which can be incorporated into electrostatic imaging systems.

The incorporation of selenium or selenium alloys into xerographic imaging members is well known. These members can be subjected to a uniform electrostatic charge for the purpose of sensitizing the surface of the photoconductive layer, followed by exposure of an image to activating electromagnetic radiation such as light, which selectively dissipates the charge in the illuminated areas of the photoconductive insulating member, wherein a latent electrostatic image is formed in the non-illuminated areas. The resulting image may then be developed and rendered visible by depositing thereon toner particles containing resin components and pigment components.

Recently, there have been developed layered organic and inorganic photoresponsive devices containing amorphous selenium, trigonal selenium, amorphous selenium alloys, or halogen doped selenium alloys. One such photoresponsive member is comprised of a substrate, a photogenerating layer containing metal phthalocyanines, metal free phthalocyanines, vanadyl phthalocyanines, or selenium tellurium alloys, and a diamine transport layer reference U.S. Pat. No. 4,265,990.

Many processes are known for the preparation of chalcogenide alloys, particularly selenium containing alloys useful as photogenerating substances, including, for example, melt blending of the elemental substances such as selenium and arsenic in the proportions desired in the final alloy product. Thus, for example, there is disclosed in U.S. Pat. No. 3,634,134 the preparation of arsenic-selenium alloys by melt blending of the appropriate proportions of arsenic and selenium. A similar melt blending method for preparing selenium alloys is disclosed in U.S. Pat. No. 3,911,091.

Also there is disclosed in U.S. Pat. No. 4,007,255 a process for preparing stable red amorphous selenium containing thallium by precipitating selenious acid, containing from about 10 parts per million to about 10,000 parts per million of thallium dioxide, with hydrazine from a solution thereof in methanol or ethanol containing not more than about 50 percent by weight of water, at a temperature between about −20 degrees Centigrade and the freezing point of the solution, wherein the resulting precipitate is maintained at a temperature of from about −13 degrees Centigrade to about −3 degrees Centigrade.

Disclosed in U.S. Pat. No. 3,723,105 is a process for preparing a selenium tellurium alloy by heating a mixture of selenium and tellurium containing 1 to 25 percent by weight of tellurium to a temperature not lower than 350 degrees Centigrade to melt the mixture, followed by gradually cooling the molten selenium and tellurium to around the melting point of the selenium tellurium alloy at a rate not higher than 100 degrees Centigrade per hour, and subsequently quenching to room temperature within 10 minutes.

Other processes for the preparation of selenium, or selenium alloys are disclosed in U.S. Pat. Nos. 4,121,981 and 3,524,745.

There is also described in copending applications the preparation of selenium in high purity, by the reduction of selenium esters, subsequent to purification, with for example hydrazine; and the preparation of chalocogenide alloys of high purity by the simultaneous low temperature coreduction of the appropriate purified chalcogenide esters. Further there is disclosed in U.S. Pat. No. 4,432,841 the preparation of selenium alloys by the electrochemical coreduction of the corresponding pure esters. While these processes are suitable for their intended purposes there remains a need for improved processes for the preparation of chalocogens, and chalcogenide alloys. Also there remains a need for improved processes for the preparation of chalcogens, and chalocogenide alloys wherein products can be obtained of certain average crystallite sizes. Additionally there continues to be a need for processes for the preparation of chalocogens, and chalocogenide alloys wherein the average crystallite sizes of the products resulting are directly dependent on the temperature of the reduction reaction. Moreover, there continues to be a need for an improved simple economically attractive, direct process for the preparation of noncrystalline chalcogenide alloys of high purity. Also, there is a need for improved processes wherein chalcogenide binary and ternary alloys can be obtained in high purity by utilizing substantially similar process parameters and apparatus. Further there continues to be a need for improved processes for the preparation of high purity chalcogens and chalocogenide alloys, wherein solvents selected for the preparation can be recycled. Also, there continues to be a need for improved processes for preparing chalcogenide alloys, and chalocogens that are homogeneous, are of a crystalline form, can be obtained in various proportions without using high temperature reaction conditions, and are of certain average crystallite sizes.

These needs can be satisfied in accordance with the process of the present invention wherein chalocogens, and homogeneous chalcogenide crystalline alloys of a desired average crystallite size are obtained, by the reduction of pure esters, or by the coreduction of a mixture of chalcogenide esters, rather than a mixture of the starting elemental components. In those situations where the rates of reductions of the esters are comparable, a composition of the resulting alloy mirrors is substantially identical to the molar composition of the mixture of esters. In other situations, when the reduction rates are not comparable, the composition of the alloys, especially with regard to ternay alloys, may not mirror the molar composition of the elements contained in the mixture of esters. Also there remains a need for processes for the preparation of noncrystalline chalcogens, and their alloys, and small particle chalcogens and their alloys of desired average crystallite sizes, wherein the resulting particles are easily dispersable in a polymer solvent system.

OBJECTS OF THE INVENTION

It is an object of the present invention to provide improved processes for the preparation of chalcogens and chalcogenide alloys which overcomes the above-noted disadvantages.

It is yet another object of the present invention to provide improved processes for the preparation of high purity chalcogens and chalcogenide alloys of desired morphology and desirable average crystallite size by simultaneously subjecting the corresponding pure esters to a reduction and a coreduction reaction respectively.

Another object of the present invention resides in the preparation of chalcogens and chalcogenide alloys of small crystallite sizes.

It is yet a further object of the present invention to provide improved processes for the preparation of high purity chalcogenide binary alloys, and ternary alloys of a desired average crystallite size, by subjecting the corresponding pure esters to a coreduction reaction.

Yet another specific object of the present invention is the provision of an improved process for preparing high purity alloys of selenium-tellurium, in the desired average crystallite size by the coreduction of a mixture of the corresponding pure esters at the appropriate temperature.

In another object of the present invention there are provided processes for the preparation of high purity chalcogenide alloys in the desired average crystallite size, which process is simple, economically attractive, presents no significant environmental pollution problems, can be effected at low temperatures, and results in the production of high yields of alloys.

A further object of the present invention is the provision of improved processes for preparing high purity homogeneous chalcogenide alloys in a crystalline form.

Yet another specific object of the present invention is the provision of an improved process for preparing selenium, and selenium alloys, in the desired average crystallite size, by the reduction, or coreduction of the corresponding pure esters at the appropriate temperatures.

Yet another specific object of the present invention is the provision of an improved process for preparing trigonal selenium and trigonal tellurium, in the desired average crystallite size by the reduction, of the corresponding pure esters of the elements.

In another object of the present invention there are provided processes for the preparation of non-crystalline chalcogens and chalcogenide alloys.

These and other objects of the present invention are accomplished by providing an improved process for the preparation of high purity non-crystalline, or crystalline chalcogens, and chalcogenide alloys of certain selected particle sizes, which comprises providing esters of the desired elements, and subsequently subjecting the pure esters to a reduction reaction. In one aspect the process of the present invention involves the preparation of chalcogenide alloys of certain selected average sizes, in a non-crystalline, or crystalline form, comprising providing esters of the desired elements by treating the corresponding oxides with an alcohol or glycol, followed by subjecting a solution mixture of the resulting esters of high purity to a coreduction reaction at certain temperature gradients. Thus, the oxides of the elements of selenium and tellurium are treated with an alcohol, or a diol so as to result in ester compositions, which are subsequently purified, and thereafter these esters are subjected to reduction reactions. The known pure selenium ester can be obtained by the condensation reaction of selenium dioxide, or selenious acid with an alcohol while the corresponding esters of tellurium are usually formed by reacting the corresponding oxides with a glycol, or by the treatment of the oxides with an alcohol, such as methanol, and the corresponding alkoxides, such as sodium methoxide. The selenium ester can also be obtained by reacting the oxides of selenium, with an alcohol, and the corresponding alkoxide. Subsequently, the resulting esters can be purified by distillation, recrystallization, and similar known purification methods.

Similarly there is prepared in accordance with the process of the present invention chalocogens, including selenium, especially trigonal selenium, and tellurium, particularly trigonal tellurium of certain selected desired average crystallite size, in high purity, by the separate reduction reactions with hydrazine of the appropriate purified esters at certain temperature gradients.

DESCRIPTION OF PREFERRED EMBODIMENTS

The process of the present invention involves in one important embodiment subjecting a mixture of high purity chalcogenide esters to a simultaneous coreduction reaction, in order to obtain a high purity alloy of desired morphology, or of certain selected average crystallite sizes, by causing the coreduction reaction to occur at a temperature of from about 50 degrees Centigrade to about 120 degrees Centigrade. The preparation of these esters, which are described in copending applications, and U.S. Pat. Nos. 4,411,698, and 4,389,389, the disclosure of each of these patents being totally incorporated herein by reference, involve the reaction of the oxides of Groups VA and VIA of the Periodic Table, with an alcohol or a glycol. The resulting mixture of chalcogenide esters subsequent to purification are then subjected to a coreduction reaction with various reducing agents, including hydrazine, and sulfur dioxide.

The selenium ester $(RO)_2SeO$, wherein R is an alkyl group, is prepared as described in copending application U.S. Ser. No. 404,259 now U.S. Pat. No. 4,548,800, titled Process For Selenium Preparation, the disclosure of which is totally incorporated herein by reference. In one method of preparation, disclosed in the copending application selenious acid, $H_2SeO_3$ is reacted with an alcohol, ROH, wherein R is an alkyl group containing from 1 carbon atom to about 30 carbon atoms, and preferably from 1 carbon atom to about 6 carbon atoms. Water resulting from this reaction can be removed by an azeotropic distillation, to yield after vacuum distillation the pure liquid diethyl selenite ester $(RO)_2SeO$, which is subjected to a reduction reaction in accordance with the process of the present invention.

Similarly a mixture of esters, subsequent to purification, can be subjected to a coreduction reaction. By coreduction in accordance with the process of the present invention is meant that the appropriate pure esters of the desired elements are simultaneously reduced by optionally dissolving these esters in a suitable organic solvent, followed by the addition of a common reducing agent. In one illustrative coreduction sequence, the reducing agent hydrazine is added dropwise to the mixture of pure esters until conversion to the chalcogenide alloys is completed as evidenced by cessation of bubbling or emission of nitrogen gas from the reaction mixture.

Examples of reducing agents that may be selected include sulfur dioxide, hydrazine, ureas, thioureas, hydroxylamine, glyoxal, phosphines, and ascorbic acid, with hydrazine being preferred.

The resulting chalcogenide alloy can then be filtered from the reaction mixture, and washed with suitable solvents such as water or cellosolve. Subsequently the alloy is allowed to dry. There results alloys of a 99.999 percent purity level subsequent to completion of the reduction reaction as determined by optical emission spectroscopy. Thus, for example, a binary alloy of selenium tellurium, containing a ratio of 4 parts of selenium to 1 part of tellurium, prepared in accordance with the process of the present invention, contains 0.3 parts per million (ppm) of silver, 0.2 parts per million of copper, 5 parts per million of iron, 3 parts per million of magnesium, 3 parts per million of silicon, undetectable amounts of aluminum, arsenic, boron, barium, bismuth, calcium, cadmium, cobalt, chromium, mercury, sodium, manganese, molybdenum, nickel, lead, antimony, tin, titanium, thallium, and zinc, with the remainder of the composition being selenium and tellurium as determined by emission spectroscopy. It is believed that impurities such as silicon, (Si), magnesium (Mg), and iron (Fe), result from the glassware and stainless steel selected for the process described.

The reduction, or coreduction reaction can be accomplished at various suitable temperatures, depending on, for example, the reducing agent selected, the desired average crystallite size, the desired morphology, and the solvent system used. Generally, the coreduction reaction is accomplished at relatively low temperatures, not exceeding about 120 degrees Centigrade. Specifically, the coreduction reaction temperature can range from about 50 degrees Centigrade to about 80 degrees Centigrade, when non-crystalline compositions are desired, and from about 80 degrees Centigrade to about 120 degrees Centigrade when crystalline materials are to be produced. The average size of the resulting crystallites can vary as indicated herein. More specifically, in one embodiment of the present invention the relationship between the reduction reaction temperature and the average crystallite size for $Se_{1-x}Te_x$ Alloys wherein x is a number of from zero (0) to one (1), were determined by coreducting with hydrazine at a temperature of 50 degrees Centigrade, 80 degrees Centigrade and 120 degrees Centigrade, solutions containing the appropriate amounts of dialkyl selenite and tetraalkoxytellurane in cellosolve. The specific amounts of esters selected is dependent on the composition desired, thus for example when alloys of the composition $Se_{9.0}Te_{1.0}$ are prepared there is selected nine moles of the respective selenium ester, and one mole of the respective tellurium ester. X-ray diffraction analysis (XRD) indicated that the alloys at 50° C. were noncrystalline, whereas the alloys precipitated at 80° C. and 120° C. were crystalline.

Table I summarizes results obtained with the process of the present invention wherein selenium-tellurium alloys were prepared at the coreduction temperature indicated; the ratio of selenium to tellurium being 9:1, and 7:3, and A represents Angstroms.

TABLE I

| Reaction Temperature (°C.) | Composition (SeTe) | Average Crystallite Size (A) |
| --- | --- | --- |
| 50 | 9:1 | Non-crystalline |
| 50 | 7:3 | Non-crystalline |
| 80 | 9:1 | 150 |
| 80 | 7:3 | 170 |
| 120 | 9:1 | 220 |
| 120 | 7:3 | 180 |

The amount of reducing agent used is dependent on a number of factors, such as its chemical composition, reaction temperatures, concentration of reactants employed, and the like. Thus, for example, hydrazine is usually added in an equimolar quantity until completion of the reduction reaction, while sulfur dioxide is generally bubbled through the solution of the esters involved for a period of time to cause complete precipitation of the chalcogenide alloys.

Thus in accordance with the process of the present invention, a selenium tellurium alloy of an average crystallite size of from about 150 Angstroms to about 220 Angstroms can be prepared by the coreduction of the corresponding pure selenium and tellurium esters with hydrazine at a temperature of from about 80 degrees Centigrade to about 120 degrees Centigrade as follows:

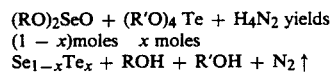

$$(RO)_2SeO + (R'O)_4Te + H_4N_2 \text{ yields} \qquad 1.$$
$$(1-x)\text{moles} \quad x \text{ moles}$$
$$Se_{1-x}Te_x + ROH + R'OH + N_2 \uparrow$$

wherein R is as defined herein, R' is an aliphatic group containing from 1 carbon atom to about 30 carbon atoms and preferably from 1 carbon atom to about 6 carbon atoms, including methyl, ethyl, propyl, butyl, heptyl, hexyl, octyl, decyl, nonyl and the like, and x is a number of from about 0.1 to about 0.99. Therefore there can be prepared selenium tellurium alloys containing from about 99 to about 1 percent by weight of selenium, and from about 1 percent to about 99 percent by weight of tellurium. Preferred alloys prepared include those compositions wherein selenium is present in an amount of from about 10 to 90 percent by weight and tellurium is present in an amount of from about 90 to 10 percent by weight. The percentages of selenium and tellurium contained in the alloy depends primarily on the amount of tellurium and selenium esters employed, such percentages corresponding substantially to the percentages of selenium and tellurium contained in the esters. Thus, for example, should a selenium tellurium alloy be desired containing 95 percent by weight of selenium and 5 percent by weight of tellurium, there is selected 95 moles of the pure selenium ester, and 5 moles of the pure tellurium ester.

Specific illustrative examples of alloys prepared in accordance with the process of the present invention include $Se_{0.9}Te_{0.1}$, average crystallite size of 150 Angstroms at a coreduction temperature of 80 degrees Centigrade, and 220 Angstroms at 120 degrees Centigrade, $Se_{0.7}Te_{0.3}$, average crystallite size of 170 Angstroms at a coreduction temperature 80 degrees Centigrade and 180 Angstroms at 120 degrees Centigrade, $Se_{0.1}Te_{0.9}$, $Se_{0.3}Te_{0.7}$, and the like.

The alloys prepared at a temperature of between about 80 degrees Centigrade and 120 degrees Centigrade in accordance with the process of the present invention were substantially pure, crystalline and fairly homogeneous as determined by optical emission spectroscopy, scanning electron microscopy (SEM), energy dispersive x-ray analysis (EDXA), x-ray diffraction (XRD), and differential scanning calorimetry (DSC). Also when the alloys are prepared at temperatures of from about 50 degrees Centigrade to about 80 degrees Centigrade it is believed that there results amorphous, or noncrystalline materials.

Moreover trigonal selenium and trigonal tellurium can be prepared in high purity, and of an average crystallite size of from about 280 Angstroms to about 520 Angstroms by subjecting the corresponding pure esters to a reduction reaction with hydrazine at a temperature of from about 40 degrees Centigrade to about 135 degrees Centigrade. More specifically trigonal selenium and trigonal tellurium can be prepared in the following manner:

TRIGONAL SELENIUM

The selenium ester, diethyl selenite is dissolved in cellosolve and a solution of hydrazine is added dropwise while varying the reaction temperature. The resulting black slurry can then be filtered and the collected black precipitate washed with cellosolve, and subsequently dried. Table II illustrates the relationship between temperature and ACS, as determined by x-ray diffraction (XRD) for five of the above described reduction reactions.

TABLE II

| Reaction Temperature (°C.) | Average Crystallite Size (A) |
|---|---|
| 40–45 | 280 |
| 50–55 | 290 |
| 65–75 | 330 |
| 80–85 | 420 |
| 95–98 | 460 |

TRIGONAL TELLURIUM

Similarly solutions of tetraalkoxytellurane in cellosolve can be reduced by the dropwise additions of hydrazine enabling the formation of trigonal tellurium, wherein the relationship between reduction temperature and crystallite size is as illustrated in Table III.

TABLE III

| Reaction Temperature (°C.) | Average Crystallite Size (A) |
|---|---|
| 40–42 | 280 |
| 60–62 | 300 |
| 80–82 | 390 |
| 104–105 | 380 |
| 135 | 520 |

The average crystallite size, ACS, or non-crystallinity of the products, were determined by x-ray diffraction patterns. An x-ray diffraction (XRD) pattern, which is a fingerprint especially unique to a polycrystalline material generally contains a number of sharp maxima, or peaks usually eight or more. These peaks are used to identify the phase of the material obtained. There is contained in the profile of each peak of the x-ray diffraction pattern information which can be used to determine the average crystallite size (ACS) of the material for the range of powder sizes which are produced by the methods described herein. Since in general crystallites are not spherical, measurements of them in different directions will yield different sizes, likewise each maximum of an x-ray diffraction pattern arises from a different set of parallel planes, that is a different direction, within the crystallite, thus the ACS determined in this way differs from peak to peak. However the ACS reported herein is the mean of the ACS of each of the first two peaks in the x-ray diffraction patterns of the materials indicated. It is important to note that the ACS of the material is not the same as its particle size as a crystallite may be thought of as a single crystal, for example a grain of ordinary table salt, while a particle need not even be crystalline. Moreover a crystallite may be at most a particle, however a particle may be comprised of one or more crystallites.

The compositions prepared in accordance with the process of the present invention can be formulated into imaging members by, for example, depositing these compositions on a suitable conductive substrate. The resulting photoconductive member can then be incorporated into an electrostatographic imaging system wherein the imaging member is charged to a suitable polarity, followed by developing the resulting latent image with a toner composition comprised of resin particles and pigment particles, and thereafter transferring the developed image to a suitable substrate such as paper, and optionally permanently affixing the image thereto. Furthermore, the compositions prepared in accordance with the process of the present invention can be utilized in layered photoresponsive devices as the photogenerating pigment. These devices usually consist of a conductive substrate, a photogenerating layer, containing a photogenerating pigment prepared in accordance with the process of the present invention, and a transport layer, reference U.S. Pat. No. 4,265,990, the disclosure of which is totally incorporated herein by reference. In these layered devices a lower crystallite size of materials is desirable since it enables a photoreceptor containing these materials to be electrically stable for a substantial number of imaging cycles.

The following examples specifically defining preferred embodiments of the present invention are now provided, which examples are not intended to limit the scope of the present invention, it being noted that various alternative parameters, including equivalents thereof, which are not specifically mentioned are included within the scope of the present invention. Parts and percentages are by weight unless otherwise indicated.

EXAMPLE I

A mixture of diethyl selenite, 21.1 grams, 0.9 moles, and tetraalkoxytellurane, 1.96 grams, 0.1 moles, was dissolved in 100 milliliters of cellosolve, in a 250 milliliter Erlenmeyer flask by stirring and warming on a magnetic stirrer. A solution of hydrazine, 6 grams, was added dropwise, while maintaining the reaction temperature between 80°-82° C. Upon completion of the reaction as indicated by the cessation of nitrogen gas, the resulting black powder alloy product was separated by filtration, followed by washing with cellosolve, three washings of 20 milliliters, drying and weighing.

The composition of the resulting alloy $Se_{0.9}Te_{0.1}$ was determined by x-ray fluorscence emission spectroscopy.

The average crystallite size (ACS) of this alloy as determined by x-ray diffraction was 150 Angstroms.

EXAMPLE II

The procedure of Example I was repeated with the exception that subsequent to adding a solution of hydrazine for causing the reduction of the ester solution, the temperature was maintained at 120° C. rather than between 80° and 82° C. An analysis of the resulting alloy product, subsequent to separation, in accordance with the process of Example I, indicated an alloy of $Se_{0.9}Te_{0.1}$, with an average crystallite size of 220 Angstroms.

EXAMPLE III

The procedure of Example I was repeated with the exception that a mixture of diethyl selenite, 16.4 grams, and tetraalkoxytellurane, 5.86 grams, were dissolved in 100 milliliters of cellosolve. Subsequent to separation and analysis of the resulting product in accordance with the procedure of Example I, there was identified a selenium tellurium alloy, of the composition $Se_{0.7}Te_{0.3}$, with an average crystallite size of 170 Angstroms.

EXAMPLE IV

A mixture of diethyl selenite, 16.4 grams, and tetraalkoxytellurane, 5.86 grams, were dissolved in 100 milliliters of cellosolve in a 250 milliliter Erlenmeyer flask by stirring and warming on a magnetic stirrer. A solution of hydrazine, 6 grams, was added dropwise to the resulting mixture, while maintaining the temperature at 120° C. Upon completion of the reaction as indicated by the cessation of nitrogen gas, the resulting black precipitate was separated by filtration, and washed with cellosolve, three 20 milliliter portions, dried and weighed.

There resulted an alloy of selenium tellurium, of the composition $Se_{0.7}Te_{0.3}$, with an average crystallite size of 180 Angstroms, as determined in accordance with the procedure of Example I.

EXAMPLE V

Noncrystalline selenium alloys were precipitated by repeating the procedure of Examples I and II with the exception that the reduction reaction was accomplished at a temperature of 50° C. and there resulted alloys of selenium and tellurium, of the composition $Se_{0.9}Te_{0.1}$ which were determined to be non-crystalline in nature as evidenced by x-ray diffraction analysis.

Similarly, noncrystalline selenium tellurium alloys were prepared by repeating the procedure of Examples III and IV with the exception that the reduction reaction was accomplished at a temperature of 50° C. and there resulted alloys of selenium and tellurium, of the composition $Se_{0.7}Te_{0.3}$ which were determined to be non-crystalline by x-ray diffraction analysis.

EXAMPLE VI

Tetraalkoxytellurane, 10 grams, was dissolved in 150 milliliters of cellosolve in a 250 milliliter Erlenmeyer flask by stirring and warming on a magnetic stirrer. A solution of hydrazine, 5 grams, and 25 milliliters cellosolve was added to the flask in a dropwise manner, while maintaining the reduction temperature between 40°–42° C. Upon completion of the reaction as indicated by the cessation of nitrogen gas, the resulting black precipitate of trigonal tellurium was separated by filtration, washed with 60 milliliters of cellosolve, three 20 milliliter portions, and dried. X-ray diffraction analysis indicated the average crystallite size of the resulting trigonal tellurium to be 280 Angstroms.

Similarly, trigonal tellurium of average crystallite sizes of 300, 390, 380 and 520 Angstroms were prepared by repeating the above procedure with the exception that the reduction reaction temperatures were 60°–62° C., 80°–82° C., 104°–105° C. and 135° C., respectively. The average crystallite sizes were determined by x-ray diffraction analysis.

EXAMPLE VII

Diethyl selenite, 20 grams, was dissolved in 100 milliliters of cellosolve in a 250 milliliter Erlenmeyer flask. A solution of 6 grams hydrazine in 25 milliliters cellosolve was added to the flask in a dropwise manner, while maintaining the reaction temperature between 40°–45° C. Subsequent to completion of the reaction as indicated by the cessation of nitrogen gas, the resulting black precipitate was separated by filtration, washed with 60 milliliters cellosolve, three 20 milliliter portions, dried and weighed. The resulting black powder which was identified as trigonal selenium, was subjected to x-ray diffraction analysis indicating an average crystallite size of 280 Angstroms.

Similarly, trigonal selenium of average crystalline sizes of 290, 330, 420 and 460 Angstroms were prepared by repeating the above procedure with the exception that the reduction reaction was effected at 50°–55° C., 65°–76° C., 80°–85° C. and 95°–98° C., respectively.

Other modifications of the present invention will occur to those skilled in the art based upon a reading of the disclosure of the present application and these modifications are intended to be included within the scope of the present invention.

We claim:

1. An improved process for the preparation of crystalline materials selected from the group consisting of trigonal selenium, and trigonal tellurium, consists essentially of providing selenium, or tellurium esters, and subjecting these esters to a reduction reaction at a temperature of from about 40° C. to about 135° C., wherein there results a product of an average crystallite size of from about 280 Angstroms to 520 Angstroms.

2. A process in accordance with claim 1 wherein there is obtained trigonal selenium of an average crystallite size of from about 280 Angstroms to 460 Angstroms at a reduction reaction temperature of from about 40° C. to about 100° C.

3. A process in accordance with claim 1 wherein the ester is diethyl selenite, the reducing agent is hydrazine, and the reduction reaction temperature is from about 40° C. to about 45° C., resulting in trigonal selenium of an average crystallite size of 280 Angstroms.

4. A process in accordance with claim 1 wherein the ester is tetraalkoxytellurane, the reducing agent is hydrazine, and the reduction reaction temperature is from about 40° C. to about 45° C., resulting in trigonal tellurium of an average crystallite size of 280 Angstroms.

5. A process for the preparation of a selenium tellurium alloy, of the composition $Se_{0.9}Te_{0.1}$, consists essentially of providing a mixture of esters of diethyl selenite and tetraalkoxytellurane, adding thereto as a reducing agent a solution of hydrazine, affecting a reduction reaction at a temperature between about 80° C. and about 85° C., thereafter separating the desired selenium tellurium product which product had an average crystallite size of about 150 Angstroms.

6. A process in accordance with claim 5 wherein there results a selenium tellurium alloy of the composition $Se_{0.9}Te_{0.1}$, with an average crystallite size of 220 Angstroms by accomplishing the reduction reaction at a temperature of about 120° C.

7. A process for the preparation of the selenium tellurium alloy $Se_{0.7}Te_{0.3}$ with an average crystallite size of 170 Angstroms, consists essentially of providing a mixture of providing esters of diethyl selenite and tetraalkoxytellurane in a molar ratio of 7 to 3, subjecting the resulting mixture of esters to a reduction reaction at a temperature of between about 80° C. and 85° C., and separating the resulting selenium tellurium composition from the reaction mixture.

8. A process for the preparation of trigonal tellurium consists essentially of dissolving 6.6 percent by weight of tetraalkoxytellurane in an organic solvent, subsequently reducing this ester with hydrazine at a temperature of between about 40° C. and 45° C., separating the desired trigonal tellurium composition from the reaction mixture, enabling a product with an average crystallite size of about 280 Angstroms.

9. A process in accordance with claim 8 wherein trigonal tellurium of average crystallite sizes of 300 Angstroms, 390 Angstroms, 380 Angstroms, and 520 Angstroms were obtained by subjecting the tetraalkoxytellurane to a reduction reaction at temperature of between about 60° C. to 62° C., 80° C. to 82° C., 104° C. to 105° C., and 135° C., respectively.

10. A process for the preparation of trigonal selenium of an average crystallite size of about 280 Angstroms consists essentially of providing a 20 percent solution of a diethyl selenite ester in an organic solvent, subjecting the resulting solution to a reduction reaction with hydrazine at a temperature of between about 40° C. to 45° C., and separating the resulting product from the reaction mixture.

11. A process in accordance with claim 10 wherein trigonal selenium of average crystallite sizes of 290 Angstroms, 330 Angstroms, 420 Angstroms, and 460 Angstroms was obtained by effecting the reduction reaction at temperatures of between about 50° C. to 55° C., 65° C. to 75° C., 80° C. to 85° C., and 195° C. to 98° C., respectively.

12. An improved process for the preparation of chalcogens and chalcogenide alloys of an average crystalline size of from about 150 Angstroms to about 520 Angstroms, which comprises providing a chalcogen or chalcogenide alloy ester, and subsequently subjecting said ester to a reduction or coreduction reaction at a temperature of from about 40° C. to about 135° C.

13. A process in accordance with claim 12 wherein noncrystalline selenium tellurium alloys are obtained by effecting the reduction, or coreduction reaction at a temperature of about 50 degrees Centigrade.

14. An improved process for the preparation of chalcogens of an average crystalline size of from about 150 Angstroms to 220 Angstroms, which comprises providing a chalcogen ester, and subsequently subjecting this ester to a reduction reaction at a temperature of from about 80° C. to about 120° C.

15. An improved process for the preparation of chalcogenide alloys of an average crystalline size of from about 150 Angstroms to 220 Angstroms, which comprises providing an ester of the chalcogenide alloy and subsequently subjecting this ester to a reduction reaction at a temperature of from about 80° C. to about 120° C.

* * * * *